Nov. 14, 1933.  A. G. CONNOLLY  1,934,967
PROCESS FOR TREATMENT OF HYDROCARBON OILS
Filed Dec. 30, 1931
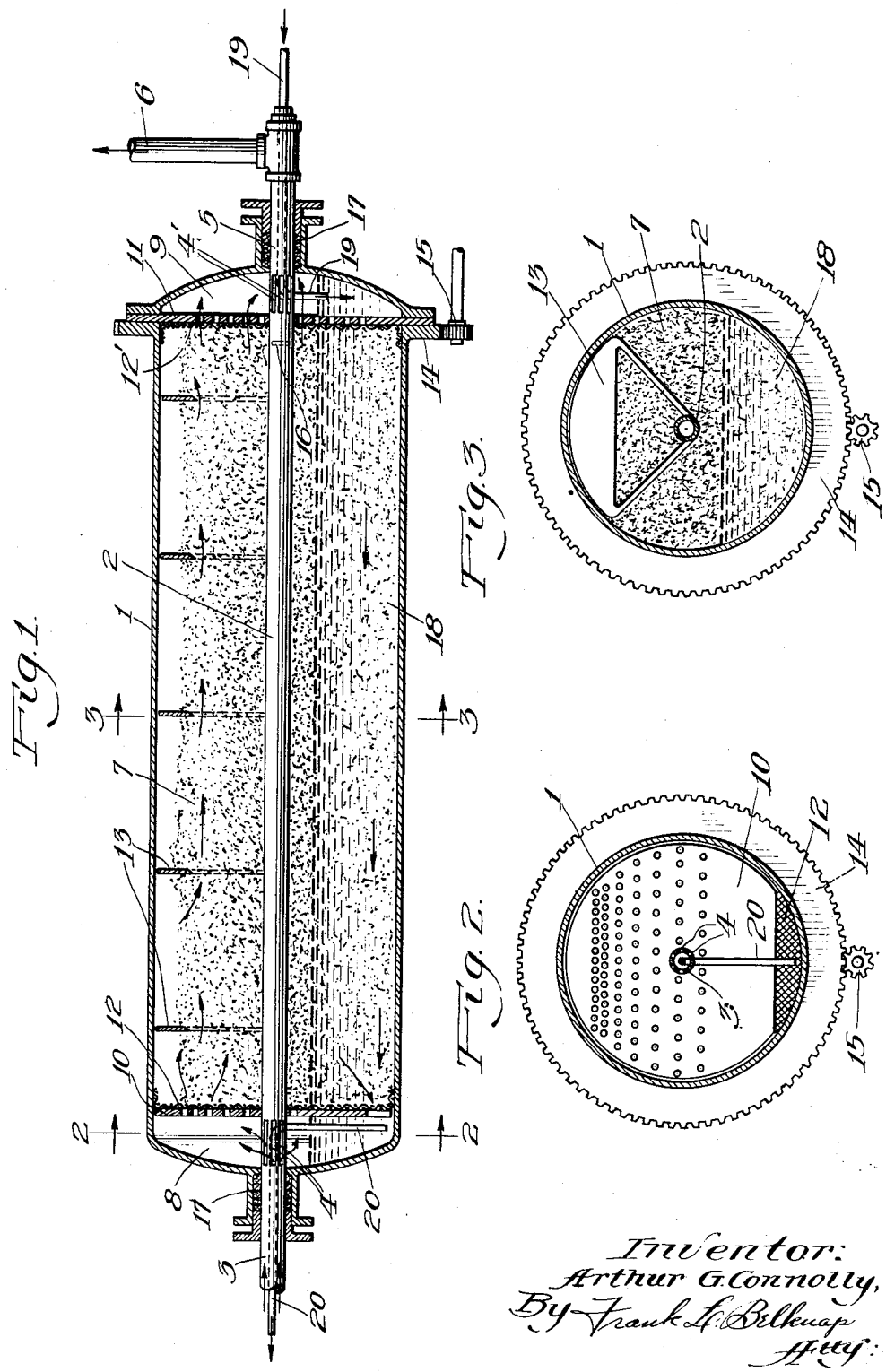
Inventor:
Arthur G. Connolly,
By Frank L. Belknap
Atty.

Patented Nov. 14, 1933

1,934,967

UNITED STATES PATENT OFFICE 1,934,967

PROCESS FOR TREATMENT OF HYDROCARBON OILS

Arthur G. Connolly, Chicago, Ill., assignor to Universal Oil Products Company, Chicago, Ill., a corporation of South Dakota Application December 30, 1931
Serial No. 583,807

3 Claims. (Cl. 196—96)

This invention relates to the treatment of hydrocarbon oils and refers more particularly to an improved process and apparatus for the treatment of hydrocarbon vapors to improve their quality.

It has come to be common practice, in the operation of vapor-phase treating processes of the type wherein hydrocarbon distillates are passed in a vaporous state through a bed of clay or other polymerizing material for the purpose of removing deleterious gum and color-forming components, to intermittently spray the bed of treating material with a portion of the condensed treated product to wash the polymers and other deleterious reaction products from the clay and render it more active. The present invention is concerned with improvements to this type of process and an improved form of apparatus suitable for their practice. The primary improvement comprises in principle continuously washing the clay or other treating material during treatment of the vapors, thereby continuously removing the deleterious reaction products substantially as soon as formed and keeping the treated material in a highly active state during the entire treating operation.

The type of material preferably employed for washing the treating material comprises another improvement of the process of the present invention although it is not desired to limit the invention to the use of any particular type of material for this purpose. Preferably, however, the washing medium used is a hydrocarbon distillate of relatively narrow boiling range and having an initial boiling point substantially the same or relatively close to the end boiling point of the particular treated product of the system. This is only an arbitrary definition, however, of the preferred washing medium, the spirit of the invention being to employ a material which will remain substantially in a liquid state in the treating zone and which will absorb from or otherwise substantially free the treating material of deleterious reaction products. Obviously the washing medium contains no substantial amount of materials which tend to contaminate either the treating material or the vapors undergoing treatment and in the preferred embodiment of the invention it is continuously or intermittently replaced by fresh washing medium before it becomes saturated with the deleterious reaction products which it removes from the treating material.

One specific embodiment of the present invention may comprise passing a hydrocarbon oil, such as cracked distillate, in a heated vaporous state in a substantially horizontal direction through a bed of treating material, such as contact clay, fuller's earth or the like, disposed within a rotating cylinder, maintaining a substantial body of washing material, such as hydrocarbon distillate of the type previously described, in said cylinder and by means of rotating said cylinder, continuously passing said treating material through said washing medium thereby continuously removing deleterious reaction products from said treating material, withdrawing treated vapors from said cylinder, withdrawing washing medium containing said deleterious reaction products from said cylinder and supplying fresh washing medium to said cylinder.

The attached diagrammatic drawing illustrates one specific form of apparatus in which the process of the present invention may be accomplished and the following description of the drawing includes a description of the process as it may be practiced in the apparatus shown.

The treating cylinder 1 is equipped with a hollow central shaft 2 through the inlet end 3 of which the vapors to be treated are introduced, passing through suitable perforations or slots 4 into the cylinder. The discharge end 5 of shaft 2 is also equipped with suitable slots or perforations 4' by means of which the treated vapors may be collected and withdrawn through line 6 to fractionation, if desired, followed by cooling and collection or to any other desired treatment. A bed of treating material 7, which may comprise, for example, contact clay, fuller's earth or similar material capable of effecting polymerization of the relatively heavy deleterious gum and color-forming components of the vapors, is maintained within cylinder 1. The inlet 8 and discharge end 9 of the cylinder are preferably separated from said treating material by means of perforated plates 10 and 11 respectively and, if desired, screens 12 and 12' of sufficiently fine mesh to retain the clay or other treating material may also be provided, as illustrated. As it will not be desirable to pack the clay or other treating material tightly into the cylinder, baffles 13 are preferably provided in the upper portion of the cylinder to prevent the vapors short-circuiting across the space which will be left in the top of the cylinder when the treating material settles. In the particular form of apparatus illustrated, baffles 13 are fastened, as shown in Figure 3, to the stationary central shaft 2 so that they will remain in an upright position across the top of cylinder 1, regardless of its rotation.

A suitable gear 14 is attached to cylinder 1 engaging with a spur gear 15 which effects rotation of the cylinder through any suitable motivating means, not illustrated.

Vapors are prevented from passing through the central shaft 2 from its inlet to its outlet end, by means of any suitable form of plug or baffle 16 and leakage is prevented around the shaft where it enters the cylinder by means of suitable packing arrangements 17.

A body 18 of washing material such as, for example, hydrocarbon distillate of the type previously described, is maintained in the lower portion of cylinder 1, a fresh washing medium being supplied as required either continuously or intermittently through line 19 while washing material which has become contaminated with deleterious reaction products removed from the treating material may be continuously or intermittently withdrawn through line 20. Preferably fresh washing material is continuously introduced to the cylinder and the contaminated washing material continuously withdrawn in such a manner that a positive flow of washing material, counter-current to the flow of vapors through the treating zone, is maintained. In this manner the freshness or purity of the washing material is at its maximum toward the vapor discharge end of treating cylinder 1 and is at a minimum toward the vapor inlet end of the cylinder, thus insuring decreasing contamination and increasing activity of the treating material from the inlet to the discharge end of the treating zone and progressively improves vapor treatment throughout the treating zone resulting in the removal, from the treating zone, of a product of maximum refinement.

Preferably pressures ranging from substantially atmospheric up to superatmospheric pressures of about 300 lbs. per sq. in. are employed in the practice of the present invention, however, if desired, sub-atmospheric or higher super-atmospheric pressures may be employed. The minimum temperature undergoing treatment is limited only to that temperature at which they will be maintained in a substantially vaporized state under the pressure conditions employed and the maximum temperature at which may be employed is limited only to temperatures below the conversion or cracking range, under the pressure conditions utilized. Operation of the process, in conjunction with a cracking plant, is contemplated and when so used will ordinarily receive vapors directly from the fractionator of the cracking system and may employ substantially the same or higher or lower pressures than those utilized in the fractionator. However, even in such cases the vapors may, if desired, be heated above their temperature at the exit from the fractionator, prior to their introduction into the treating zone.

As a specific example of the operation of the process of the present invention and the improved results obtainable by its use as compared with ordinary vapor-phase treating methods, the oil to be treated is a distillate in vapor form from the fractionator of a cracking process, boiling substantially within the range of motor fuel, having a gum content of approximately 350 mgs., a yellow color and of poor gum and color stability even after the usual liquid-phase chemical treatment. When these vapors are subjected to polymerization treatment by passing them through a bed of fuller's earth in the usual manner, their gum content may be reduced approximately 50 mgs. and the finished product may have a 28 color and may be fairly stable with regards to color and gums, upon exposure to sunlight. When operating the usual vapor-phase treating process at substantially atmospheric pressure or under relatively low super-atmospheric pressure a ton of treating material may treat some 1500 barrels of distillate before it should be renewed and under substantial super-atmospheric pressures of the order of 150 pounds per sq. in. or thereabouts, it may be possible to treat as much as 2500 barrels of distillate per ton of clay.

By the improved process of the present invention the same vapors may be reduced in gum content to 15 mgs. while the color may be improved to 30 plus with good color and gum stability on prolonged exposure to sunlight. By continuous washing of the treating material, in accordance with the provisions of the present invention, as much as 4000 barrels of distillate may be treated, per ton of treating material, before it becomes necessary to replace it, even under substantially atmospheric pressure conditions. When operated under pressures of the order of 150 pounds or thereabouts per sq. in., the improved process of the present invention may permit treatment of as much as 8000 barrels of distillate per ton of treating material.

I claim as my invention:

1. In the refining of hydrocarbon vapors by passage through a bed of solid filtering material, the method which comprises positioning the filtering material in the upper portion of a substantially horizontal treating zone, maintaining a body of washing liquid in the lower portion of the treating zone, passing the vapors through the treating zone and in contact with the filtering material therein, and rotating the treating zone whereby the filtering material is contacted with the washing liquid.

2. The method as defined in claim 1 further characterized in that the washing liquid comprises a hydrocarbon oil which is substantially non-volatile at the temperatures prevailing in the treating zone.

3. The method as defined in claim 1 further characterized in that the washing liquid is passed through the treating zone in a direction generally counter-current to the direction of flow of the vapors through the heating zone.

ARTHUR G. CONNOLLY.